(12) United States Patent
Lindau

(10) Patent No.: US 8,808,434 B2
(45) Date of Patent: Aug. 19, 2014

(54) METHOD AND A DEVICE FOR REMOVING MERCURY FROM A PROCESS GAS

(71) Applicant: ALSTOM Technology Ltd, Baden (CH)

(72) Inventor: Lief A. V. Lindau, Arlov (SE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/134,527

(22) Filed: Dec. 19, 2013

(65) Prior Publication Data

US 2014/0102305 A1      Apr. 17, 2014

Related U.S. Application Data

(62) Division of application No. 13/124,904, filed as application No. PCT/EP2009/063539 on Oct. 16, 2009, now Pat. No. 8,647,411.

(30) Foreign Application Priority Data

Oct. 20, 2008  (EP) .................................... 08167051

(51) Int. Cl.
| | | |
|---|---|---|
| B01D 53/02 | (2006.01) | |
| B01D 46/00 | (2006.01) | |
| B01D 46/44 | (2006.01) | |
| B01D 53/10 | (2006.01) | |
| B01D 53/30 | (2006.01) | |
| B01D 53/04 | (2006.01) | |
| B01D 46/02 | (2006.01) | |

(52) U.S. Cl.
CPC ...... *B01D 53/0454* (2013.01); *B01D 2257/602* (2013.01); *B01D 46/0036* (2013.01); *B01D 46/446* (2013.01); *B01D 53/10* (2013.01); *B01D 53/30* (2013.01); *B01D 46/44* (2013.01); *B01D 46/02* (2013.01)
USPC ...................... 96/111; 95/11; 95/134; 95/148

(58) Field of Classification Search
USPC ................... 95/11, 134, 148; 96/111
See application file for complete search history.

(56) References Cited

U.S. PATENT DOCUMENTS

| | | |
|---|---|---|
| 4,746,331 A | 5/1988 | Truce |
| 5,505,766 A | 4/1996 | Chang |
| 5,854,173 A | 12/1998 | Chang et al. |
| 2004/0124155 A1 | 7/2004 | Meegan, Jr. |
| 2005/0150376 A1 | 7/2005 | Crawley et al. |
| 2006/0210463 A1 | 9/2006 | Comrie |

*Primary Examiner* — Christopher P Jones
(74) *Attorney, Agent, or Firm* — Rita D. Vacca

(57) ABSTRACT

A method of removing mercury from a process gas by means of a sorbent and a filter (10) involves applying said sorbent to at least one filtering surface (12) of the filter (10). A first parameter, which is indicative of the amount of mercury that needs to be removed in said filter (10), and a second parameter, which is indicative of the amount of material that has been collected on said filtering surface (12), are measured. A measured value of said first parameter is compared to a mercury set point. When said measured value of said first parameter is higher than said mercury set point, the cleaning of said filtering surface (12) is delayed, compared to the point in time suggested by a measured value of said second parameter.

4 Claims, 4 Drawing Sheets

METHOD AND A DEVICE FOR REMOVING MERCURY FROM A PROCESS GAS

This is a divisional application claiming priority to pending application Ser. No. 13/124,904 having a filing date of Oct. 16, 2009, which claims priority to International Application No. PCT/EP2009/063539 having an International Filing Date of Oct. 16, 2009, which claims priority to EP Application No. 08167051.5 having a filing date of Oct. 20, 2008, incorporated herein in its entirety by reference.

FIELD OF THE INVENTION

The present invention relates to a method of removing, at least partly, mercury from a process gas by means of a mercury absorbing sorbent and a filter having at least one filtering surface.

The present invention further relates to a gas cleaning system, which is operative for removing, at least partly, mercury from a process gas, the gas cleaning system comprising a sorbent supply system which is operative for supplying a mercury absorbing sorbent to said process gas, and a filter having at least one filtering surface and being operative for collecting said sorbent.

BACKGROUND OF THE INVENTION

In the combustion of a fuel, such as coal, oil, peat, waste, etc., in a combustion plant, such as a power plant, a hot process gas is generated, such hot process gas containing, among other components, mercury, Hg. Since mercury is hazardous to the human health and to the environment it is usually necessary to remove mercury from the process gas before it can be discharged into the ambient air. The removal of mercury is often accomplished by mixing the hot process gas with a solid sorbent, such as pulverized activated carbon, which adsorbs the mercury and which can then be removed from the hot process gas in a filter, such as a bag house.

U.S. Pat. No. 5,505,766 describes a gas cleaning system in which a sorbent is supplied to a bag house from a silo. The sorbent forms a sorbent layer on filter bags of the bag house. When a sufficiently thick sorbent layer has been formed on the filter bags, the hot process gas is admitted to the bag house. When the removal of mercury decreases a compartment of the bag house is taken off-line, such that the mercury loaded sorbent can be removed, and new sorbent can be added to the bags, before the process gas is again allowed to enter the compartment in question.

While the gas cleaning system of U.S. Pat. No. 5,505,766 ensures that a layer of sorbent will always be available on the filter bags for the removal of mercury from the process gas, it is also a complicated process that requires an advanced control and expensive equipment. Furthermore, the bag house must be over-sized compared to normal operation, to allow that one compartment at a time is taken off-line for cleaning.

SUMMARY OF THE INVENTION

An object of the present invention is to provide a method of cleaning a process gas, which method is more effective for removing mercury from such process gas compared to the prior art method.

This object is achieved by means of a method of removing, at least partly, mercury from a process gas by means of a mercury absorbing sorbent and a filter having at least one filtering surface, the method being characterised in
applying said sorbent to said at least one filtering surface,
measuring at least one first parameter, which is indicative of the amount of mercury that needs to be removed in said filter,
measuring at least one second parameter, which is indicative of the amount of material that has been collected on said filtering surface and which is utilized for determining when the filtering surface should be cleaned,
comparing a measured value of said first parameter to a mercury set point, and
delaying, when said measured value of said first parameter is indicating an amount of mercury which is higher than the amount of mercury indicated by said mercury set point, the cleaning of said filtering surface, compared to the point in time suggested by a measured value of said second parameter.

An advantage of this method is that the mercury removal capacity of the filter can be increased, temporarily, without increasing the sorbent consumption. The measurement of the first parameter makes it possible to effect such increased mercury removal capacity when needed.

According to one embodiment said mercury set point is related to the concentration of mercury in the process gas upstream of the filter, said first parameter being related to the concentration of mercury in the process gas upstream of the filter. The amount of mercury that needs to be removed in the filter is related to the amount of mercury in the process gas that enters the filter. Measuring the concentration of mercury in the process gas upstream of the filter thus provides a feed-forward input for determining the required mercury removal capacity of the filter.

According to one embodiment said mercury set point is related to the concentration of mercury in the process gas downstream of the filter, said first parameter being related to the concentration of mercury in the process gas downstream of the filter. The concentration of mercury downstream of the filter is an indication of whether the filter operates in a sufficiently efficient manner, with regard to emission limits. Measuring the concentration of mercury in the process gas downstream of the filter thus provides a feed-back input for determining the required mercury removal capacity of the filter.

According to one embodiment said first parameter is related to the concentration of mercury both upstream and downstream of the filter. Such a first parameter makes it possible to control the cleaning of the filtering surfaces more accurately, by taking into account both the feed-forward information about how much mercury that needs to be removed, and the feed-back information about how well the filter manages to remove the mercury.

In accordance with one embodiment the concentration of mercury is measured both upstream and downstream of the filter, at least one of such measured concentrations being utilized for determining said first parameter, at least the other of such measured concentrations being utilized for determining a third parameter, which is utilized for controlling the supply of said sorbent. An advantage of this embodiment is that the control system can control both the cleaning of the filtering surfaces of the filter, and the dosage of sorbent to obtain the most efficient removal of mercury, with regard to consumption of energy and sorbent.

According to one embodiment said second parameter is a pressure drop over the filter, the cleaning of the filtering surface being initiated when said second parameter exceeds a first pressure drop set point in situations when the measured value of said first parameter indicates an amount of mercury which is equal to, or lower than, the amount of mercury indicated by said mercury set point, and being initiated when said second parameter exceeds a second pressure drop set point, which refers to a higher pressure drop than the first pressure drop set point, when said measured value of said first parameter indicates an amount of mercury which is higher than the amount of mercury indicated by said mercury set point. An advantage of this embodiment is that cleaning of the filter is allowed to start at a lower pressure drop when the concentration of mercury in the process gas is low, such that the energy consumed, including, e.g., fan power, by the filter is low. When the concentration of mercury is high in the process gas, the cleaning is delayed, such that increased mercury removal is effected. The pressure drop functions as an indirect indicator of the removal efficiency of the filter, since there is a relation between the pressure drop and the thickness of the dust cake, and a similar relation between the thickness of the dust cake and the mercury removal efficiency. It will be appreciated that a measure, such as the filter flow resistance, providing equivalent information on the amount of material existing on the filtering surface, may be utilized as alternative to the pressure drop.

According to one embodiment said cleaning of said filtering surface is performed at a first cleaning intensity when said measured value of said first parameter is indicating an amount of mercury which is higher than the amount of mercury indicated by said mercury set point, and at a second cleaning intensity, being higher in cleaning efficiency than said first cleaning intensity, when said measured value of said first parameter is indicating an amount of mercury which is equal to, or lower than, the amount of mercury indicated by said mercury set point. An advantage of this embodiment is that in situations of high requirement for mercury removal the cleaning of the filtering surfaces is made in a less efficient way. In this manner a part of the dust cake remains on the filtering surfaces also after the cleaning, such that mercury removal immediately after such cleaning remains on a high level.

An further object of the present invention is to provide a gas cleaning system which is operative for removing mercury from a process gas and which is more efficient compared to the prior art gas cleaning systems.

This object is achieved by means of a gas cleaning system which is operative for removing, at least partly, mercury from a process gas, the gas cleaning system comprising a sorbent supply system which is operative for supplying a mercury absorbing sorbent to said process gas, and a filter having at least one filtering surface and being operative for collecting said sorbent, the gas cleaning system being characterised in further comprising a control unit which is operative for controlling when said filtering surface is to be cleaned from material that has been collected thereon, said control unit further being operative for receiving a first signal referring to a measurement of at least one first parameter, which is indicative of the amount of mercury that needs to be removed in said filter, and a second signal referring to a measurement of at least one second parameter, which is indicative of the amount of material that has been collected on said filtering surface and which is utilized for determining when the filtering surface should be cleaned, the control unit further being operative for comparing a measured value of said first parameter to a mercury set point, and for delaying, when said measured value of said first parameter is indicating an amount of mercury which is higher than the amount of mercury indicated by said mercury set point, the cleaning of said filtering surface, compared to the point in time suggested by a measured value of said second parameter.

An advantage of this gas cleaning system is that it is effective for removing mercury, also in a situation of varying mercury concentrations, a situation in which the prior art gas cleaning systems would require a substantial increase in the sorbent supply. Thus, the present gas cleaning system provides for a low sorbent supply, and, consequently, also a low formation of waste products, without increasing the emission of mercury.

According to a further aspect of the present invention said method of removing, at least partly, mercury from a process gas by means of a mercury absorbing sorbent and a filter having at least one filtering surface is characterised in applying said sorbent to said at least one filtering surface, measuring at least one first parameter, which is indicative of the amount of mercury that needs to be removed in said filter, measuring at least one second parameter, which is indicative of the amount of material that has been collected on said filtering surface and which is utilized for determining when the filtering surface should be cleaned, comparing a measured value of said first parameter to a mercury set point, and cleaning said filtering surface at a first cleaning intensity when said measured value of said first parameter is indicating an amount of mercury which is higher than the amount of mercury indicated by said mercury set point, and at a second cleaning intensity, being higher in cleaning efficiency than said first cleaning intensity, when said measured value of said first parameter is indicating an amount of mercury which is equal to, or lower than, the amount of mercury indicated by said mercury set point.

An advantage of this method is that the mercury removal capacity of the filter can be increased, temporarily, by leaving more of the sorbent remaining on the filtering surface after cleaning due to a less intense cleaning of the filtering surface, without increasing the sorbent consumption. The measurement of the first parameter makes it possible to effect such increased mercury removal capacity when needed.

Further objects and features of the present invention will be apparent from the description and the claims.

BRIEF DESCRIPTION OF THE DRAWINGS

The invention will now be described in more detail with reference to the appended drawings in which.

DESCRIPTION OF PREFERRED EMBODIMENTS

Figure 1:
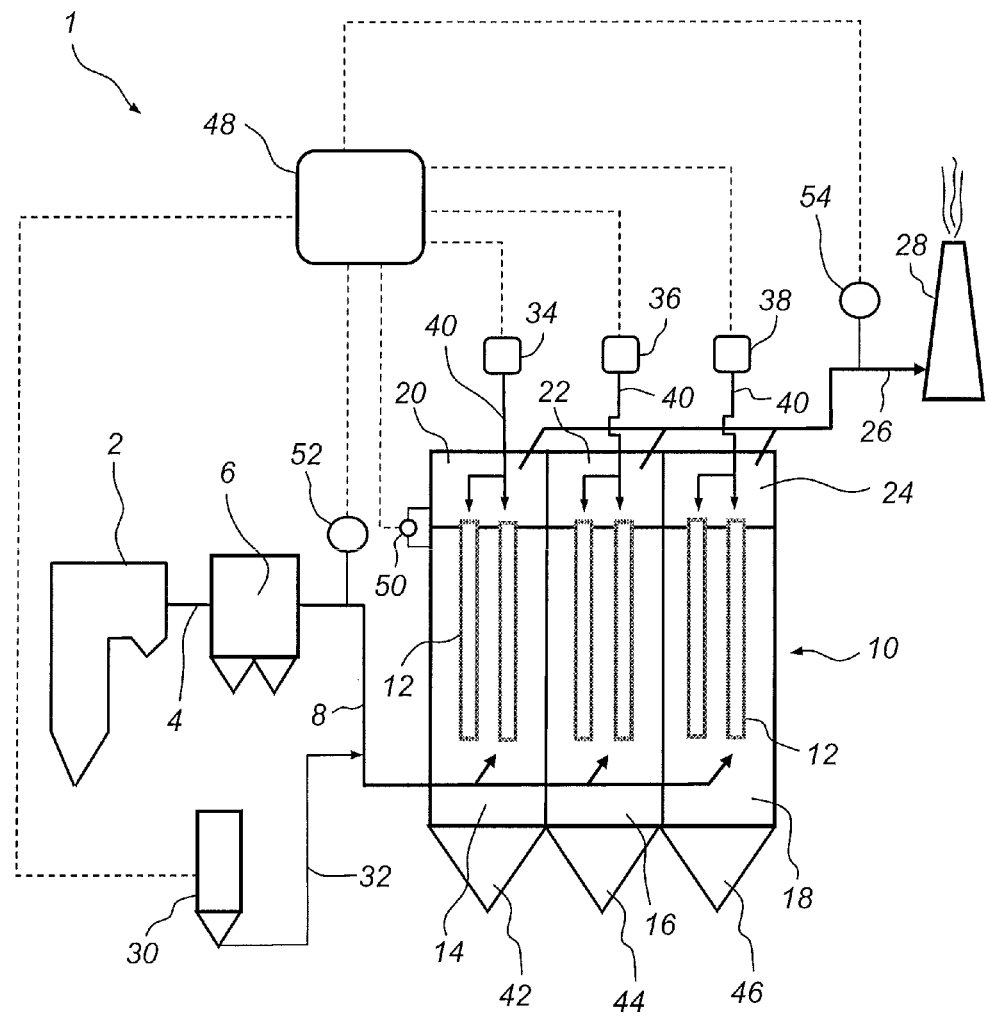
FIG. 1 is a schematic side view of a power plant.

FIG. 1 is a schematic side view and illustrates a power plant 1, as seen from the side thereof. The power plant 1 comprises a boiler 2. During combustion of a fuel, such as coal or oil, a hot process gas, often referred to as a flue gas, is generated in the boiler 2. The flue gas, which contains polluting substances, including dust particles and mercury, leaves the boiler 2 via a gas duct 4. The gas duct 4 is operative for forwarding the flue gas to a primary dust collector 6, which is optional, in the form of, e.g., an electrostatic precipitator, an example of which is described in U.S. Pat. No. 4,502,872, or a bag house, an example of which is described in U.S. Pat. No. 4,336,035. The primary dust collector 6 is operative for removing the major amount of dust particles from the flue gas.

A gas duct 8 is operative for forwarding the flue gas from the primary dust collector 6 to a secondary dust collector 10. The secondary dust collector 10 is a fabric filter, by which is meant that the flue gas is forced to pass through a filtering surface formed from a fabric material. The secondary dust collector 10 illustrated in FIG. 1 is a fabric filter of the so-called bag house type, which comprises a plurality of filter bags 12 made of a textile fabric. The fabric of the filter bags 12 form filtering surfaces by means of which particulate material can be removed from the flue gas. A detailed description of an example of a bag house can be found in U.S. Pat. No. 4,336,035. The bag house 10 has three compartments 14, 16, 18. Each such compartment 14, 16, 18 may comprise typically 2 to 20 000 filter bags 12. As can be seen from a reference to FIG. 1, the duct 8 is operative for supplying a separate flow of flue gas to each of the compartments 14, 16, 18.

The flue gas passes through the textile fabric material of the respective filter bag 12, such that dust particles contained in the flue gas is captured on the outside of the bags 12. When passing through the fabric material of the filter bags 12 also very small dust particles are removed from the flue gas, resulting in a very efficient removal of dust particles. The cleaned flue gas enters a clean gas plenum 20, 22, 24 of the respective compartment 14, 16, 18. A clean gas duct 26 is operative for forwarding the cleaned flue gas from each of the respective plenums 20, 22, 24 to a stack 28, which is operative for discharging the cleaned flue gas to the ambient air.

A sorbent storage silo 30 is operative for containing a sorbent which is suitable for adsorbing mercury, in particular mercury in gaseous form. A suitable sorbent could be activated carbon or coke in powdered form. A sorbent supply duct 32 is operative for forwarding the sorbent from the silo 30 to the duct 8, in which the sorbent is mixed with the flue gas.

The sorbent, being a particulate material, will be collected on the fabric of the filter bags 12. The fabric material supports the formation of a dust cake on the outer face of each of the filter bags 12. Such a dust cake, which will contain sorbent supplied from the silo 30, is very efficient in removing mercury from the flue gas, because the flue gas has to pass through the dust cake. When passing through such a dust cake, containing the sorbent, the chance is high that mercury contained in the flue gas is adsorbed in the dust cake.

The dust cake formed on the respective filter bag 12 will increase the flue gas pressure drop over the bag house 10. Thus, it will be necessary to perform intermittent cleaning of the filter bags 12. Each compartment 14, 16, 18 is provided with a tank 34, 36, 38 containing pressurized gas, usually in the form of pressurized air. The pressurized air may be supplied, as air pulses, via pipes 40 to the filter bags 12. Such air pulses forces the filter bags 12 to expand and causes the dust cakes to leave the bags 12 and fall into a respective hopper 42, 44, 46 from which the collected dust particles may be transported away for further treatment, disposal, etc.

A control unit 48 is operative for controlling when the filter bags 12 should be cleaned. Each compartment 14, 16, 18 is provided with a pressure transducer which measures the pressure drop over the filter bags 12 of that specific compartment 14, 16, 18. A signal is sent from each of the pressure transducers to the control unit 48. For reasons of clarity of illustration only the pressure transducer 50 of the first compartment 14 is illustrated in FIG. 1.

A first mercury analyser 52 is operative for measuring the concentration of mercury in the flue gas in the duct 8, upstream of the bag house 10. The first mercury analyser 52 thus measures the concentration of gaseous mercury, Hg, in the flue gas before the sorbent has had any effect. A second mercury analyser 54 is operative for measuring the concentration of gaseous mercury in the flue gas in the clean gas duct 26, downstream of the bag house 10. The second mercury analyser 54 thus measures the concentration of mercury in the cleaned flue gas. The mercury analysers 52, 54 are operative for sending signals to the control unit 48. Preferably measurements are performed by the mercury analysers 52, 54, and corresponding signals are sent to the control unit 48, at least once every 30 minutes to obtain a quick response to changing conditions. The control unit 48 takes the signals from the pressure transducers, of which only one transducer 50 is illustrated in FIG. 1, and the signals from the mercury analysers 52, 54 into account when controlling the operation of the tanks 34, 36, 38, i.e., when controlling the cleaning of the filter bags 12 of the respective compartment 14, 16, 18 by means of pulsing, in a manner which will be described in more detail hereinafter. Furthermore, the control unit 48 may also control the supply of sorbent from the sorbent silo 30 in a manner which will be described in more detail hereinafter.

As described hereinbefore the control unit 48 receives a signal from the pressure transducer 50 which indicates the present pressure drop over the filter bags 12 of the first compartment 14. This measured pressure drop can be denoted DP. The control unit 48 further works with two set points for pressure drop. A first pressure drop set point, which can be denoted DPHigh, indicates a pressure drop above which a cleaning of the filter bags 12 is desirable, since a pressure drop above DPHigh is associated with an increased energy consumption for forcing the flue gas through the filter bags 12 of the compartment 14. A second pressure drop set point, which can be denoted DPHighHigh, indicates a pressure drop at which a cleaning of the filter bags 12 must be initiated, also for reasons of such high pressure drop affecting the mechanical integrity of the bag house 10. The table 1 below indicates the basis for cleaning the bags 12 at different measured pressure drops, DP:

TABLE 1

Cleaning of filter bags, in relation to pressure drop

| | DP relation to set points | | |
|---|---|---|---|
| | DP < DPHigh | DPHigh < DP < DPHighHigh | DP > DPHighHigh |
| Cleaning of filter bags | No | Depends also on other conditions | Yes |

As described hereinbefore the control unit 48 also receives a signal from the first mercury analyser 52. The measured concentration of mercury in the flue gas in the duct 8 can be denoted HGIN. The control unit 48 further works with a mercury set point for the mercury concentration upstream of the bag house 10. Such a mercury set point could be equal to the average concentration of mercury in the flue gas, upstream of the bag house 10, i.e., in the duct 8, and could be denoted HGMEAN. The control unit 48 utilizes the measured concentration HGIN as a first parameter and compares such concentration to the mercury set point HGMEAN. When HGIN is less than or equal to HGMEAN the cleaning of the filter bags 12 is based only on the pressure drop DP. Hence, if HGIN is equal to, or less than, HGMEAN, the filter bags 12 are cleaned, by means of pulsing them by pressurized air as described hereinbefore, as soon as the measured pressure drop DP, such pressure drop being utilized as a second parameter, exceeds DPHigh. Such an approach results in the lowest possible energy consumption, and a sufficient removal of mercury.

However, in situations where the measured concentration of mercury HGIN is higher than the mercury set point HGMEAN it is desirable to maintain a comparably thick dust cake on the filter bags 12, since such a thick dust cake is more efficient for removing mercury from the flue gas compared to a thin dust cake. Hence, in such situations, where the inlet concentration of mercury, i.e., HGIN, is comparably high, the control unit 48 delays the cleaning of the filter bags 12, such that the cleaning of the filter bags 12 does not start until the measured pressure drop DP exceeds the second pressure drop set point DPHighHigh. Thus, in situations of high inlet concentration of mercury a higher pressure drop over the bag house 10 is accepted, since such higher pressure drop also results in the filter bags 12 having on them a thicker dust cake, which contains sorbent and which is effective for removing such high concentration of mercury, without requiring an increased dosage of sorbent from the silo 30. The pressure drop DP measured over the bag house 10 thus functions as an indirect indicator of the removal efficiency of the bag house 10, since there is a relation between the pressure drop DP and the thickness of the dust cake on the filter bags 12, and a similar relation between the thickness of the dust cake on the filter bags 12 and the mercury removal efficiency of the bag house 10.

The table 2 below indicates the different decisions on the cleaning that are taken by the control unit 48:

TABLE 2

| Decisions taken by the control unit 48 | | |
|---|---|---|
| | HGIN relation to set point | |
| | HGIN < or = HGMEAN | HGIN > HGMEAN |
| Cleaning of filter bags | As soon as DP > DPHigh | Not until DP > DPHighHigh |

In this way the gas cleaning system, comprising the bag house 10 and the sorbent silo 30, is operative for effectively removing mercury from the flue gas also in situations where the inlet concentration of mercury is higher than normal.

Figure 2:
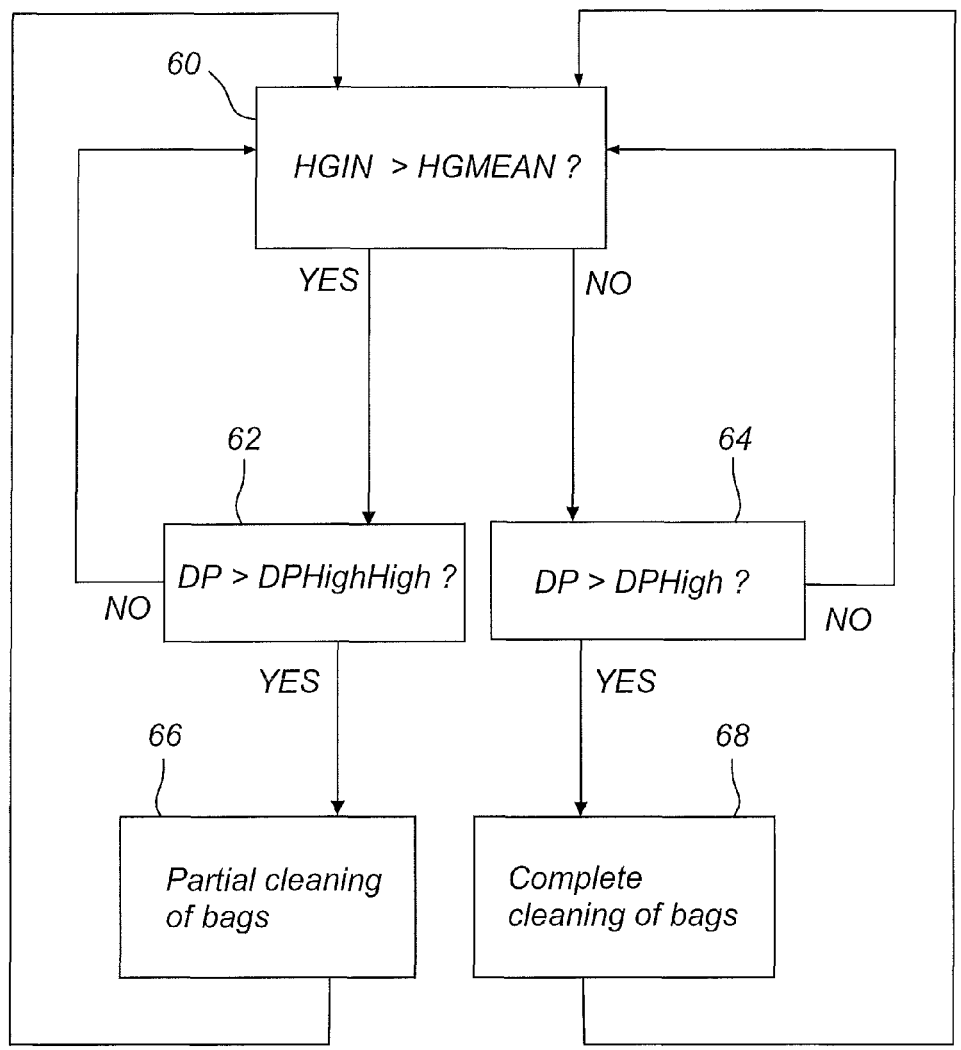
FIG. 2 is a flow diagram and illustrates a method of controlling the cleaning of filter bags of a bag house.

FIG. 2 illustrates in a graphical manner the method, described hereinbefore, according to which the control unit 48 controls when the filter bags 12 of the first compartment 14 of the bag house 10 should be cleaned by means of pulsing them. In a first step, denoted 60 in FIG. 2, the control unit 48 has received a signal from the first mercury analyser 52 about the measured concentration of mercury in the flue gas in the duct 8. The control unit 48 checks if the measured concentration of mercury, HGIN, is higher than the average inlet concentration of mercury, HGMEAN. If the answer in the first step 60 is "YES", then the control unit 48 proceeds to a first alternative second step, denoted 62 in FIG. 2, in which the control unit 48 checks whether the measured pressure drop DP is higher than the second pressure drop set point DPHighHigh. If the answer in the first step 60 is "NO", then the control unit 48 proceeds to a second alternative second step, denoted 64 in FIG. 2, in which the control unit 48 checks whether the measured pressure drop DP is higher than the first pressure drop set point DPHigh.

If the outcome of the check in the first alternative second step 62 is "NO", then the control unit 48 returns to the first step 60 without performing any cleaning of the filter bags 12. In accordance with the first step 60 a new measured mercury concentration HGIN is compared to the average mercury concentration HGMEAN. Thus, in such a situation, the dust cake remains on the filter bags 12 for an extended period of time, to increase the mercury removal capacity of the bag house 10, without having to add more sorbent than under normal mercury concentrations. If the outcome of the check in the first alternative second step 62 is "YES", then the control unit 48 proceeds to a first alternative third step, denoted 66 in FIG. 2, in which the bags 12 are cleaned. Preferably, the first alternative third step 66 includes a partial cleaning of the filter bags 12. Such a partial cleaning of the filter bags 12 could be accomplished by supplying a lower than normal air pressure from the tanks 34, 36, 38, or by supplying such air pressure for a shorter period of time. A partial cleaning of the filter bags 12 means cleaning at a lower cleaning intensity than normal, and has the advantage of leaving more sorbent remaining on the filter bags 12, such that also after such partial cleaning a certain mercury removal remains.

If the outcome of the check in the second alternative second step 64 is "NO", then the control unit 48 returns to the first step 60 without performing any cleaning of the bags filter 12, since such cleaning is not necessary. If the outcome of the check in the second alternative second step 64 is "YES", then the control unit 48 proceeds to a second alternative third step, denoted 68 in FIG. 2, in which the filter bags 12 are cleaned. The second alternative third step 68 represents a full cleaning, i.e., cleaning at normal cleaning efficiency, resulting in removal of almost all of the sorbent from the filter bags 12. In such a situation, in which the concentration of mercury HGIN is equal to, or less than, the average mercury concentration HGMEAN, there is no need for an extra dust cake on the filter bags 12, and, thus, the cleaning of the filter bags 12 is controlled based on the pressure drop only.

After having cleaned the filter bags 12 in the third step 66 or 68, the control unit 48 returns to the first step 60.

The method illustrated in FIG. 2 could be applied to the bag house 10 seen as a whole, meaning that all compartments 14, 16, 18 are cleaned at the same time when the control unit 48 proceeds to the third step 66 or 68. Often it is more advantageous, however, to apply the method illustrated in FIG. 2 separately to each of the three compartments 14, 16, 18. Hence it could happen, in a situation when HGIN is higher than HGMEAN, that one of the compartments, e.g., compartment 14, must be cleaned, because the pressure drop DP over that compartment 14, as measured by the pressure transducer 50, exceeds the second pressure drop set point DPHighHigh. The other two compartments 16 and 18 may, however, not be in need of cleaning, by which is meant that the pressure drop over those respective compartments 16, 18 is lower than DPHighHigh, which means that those two compartments 16, 18 could maintain their thick dust cakes and maintain a high efficiency in mercury removal. Thus, the decreased mercury removal of the compartment 14, caused by the necessary cleaning of the filter bags 12 of that compartment 14, could be compensated for by the other compartments 16, 18, such that the mercury removal of the bag house 10 seen as a whole would be sufficiently efficient.

In an alternative embodiment the control unit 48 could receive a signal from the second mercury analyser 54, measuring the concentration of mercury in the cleaned flue gas, i.e., the flue gas in the clean gas duct 26. Such a signal could be utilized by the control unit 48 for controlling when cleaning of the filter bags 12 should be made. For instance, if the measured concentration of mercury in the clean gas duct 26 is substantially lower than the mercury emission limit, then the control unit 48 could control the cleaning of the filter bags 12 based on the pressure drop DP in relation to the first pressure drop set point DPHigh, i.e., in a similar manner as indicated in FIG. 2 with reference to the second alternative of the second step 64. If, on the other hand, the measured concentration of mercury in the clean gas duct 26 is quite close to the mercury emission limit, or even higher than that limit, then the control unit 48 could control the cleaning of the filter bags 12 based on the pressure drop DP in relation to the second pressure drop set point DPHighHigh, i.e., in a similar manner as indicated in FIG. 2 with reference to the first alternative of the second step 62, to maintain a thick cake of dust on the bags 12 to maintain a high efficiency in the removal of mercury.

Figure 3:
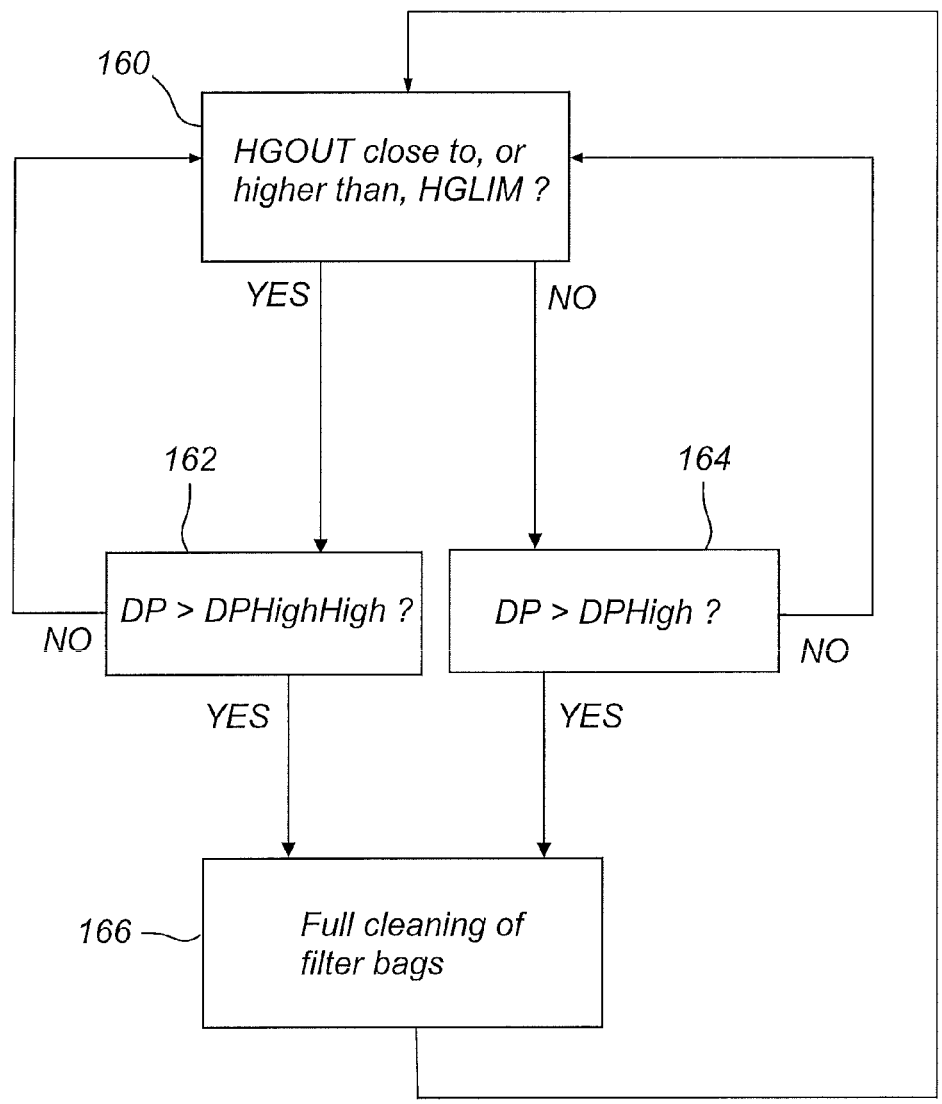
FIG. 3 is a flow diagram and illustrates an alternative method of controlling the cleaning of filter bags of a bag house.

FIG. 3 illustrates in a graphical manner the alternative method, described hereinbefore, according to which the control unit 48 controls when the filter bags 12 of the first compartment 14 of the bag house 10 should be cleaned by means of pulsing them. In a first step, denoted 160 in FIG. 3, the control unit 48 has received a signal from the second mercury analyser 54 about the measured concentration of mercury in the clean flue gas in the duct 26. The control unit 48 checks if the measured concentration of mercury, HGOUT, is close to, or even higher than, the emission limit concentration of mercury, HGLIM, which could be a concentration set by, e.g., environmental authorities. If the answer is "YES", then the control unit 48 proceeds to a first alternative second step, denoted 162 in FIG. 2, which has a similar function as the first alternative second step 62 described hereinbefore with reference to FIG. 2. Thus, in a situation when the outlet concentration of mercury, HGOUT, is close to, or even above, the mercury emission limit, HGLIM, the dust cake is allowed to remain on the filter bags 12 for an extended period of time, to increase the mercury removal capacity of the bag house 10, without having to add more sorbent than under normal mercury concentrations. If the answer in the first step 160 is "NO", then the control unit 48 proceeds to a second alternative second step, denoted 164 in FIG. 3, which has a similar function as the second alternative second step 64 described hereinbefore with reference to FIG. 2. A third step 166, following the answer "YES" in step 162 or 164, involves a full cleaning of the filter bags 12. As alternative, the cleaning of the filter bags 12 could be performed in different manners, depending on the outcome of the first step 160, in a similar manner, i.e., at a low or a normal cleaning efficiency, as described hereinbefore with reference to FIG. 2 concerning the third steps 66 and 68. After having cleaned the filter bags 12 in the third step 166, the control unit 48 returns to the first step 160.

The method described with reference to FIG. 3 could be utilized for controlling the cleaning of the filter bags 12 of the bag house 10 as a whole, or for controlling, separately, the cleaning of the bags 12 of each respective compartment 14, 16, 18.

In a still further embodiment the control unit 48 could utilize information from both the first and the second mercury analysers 52, 54. For example, the control unit 48 could control the cleaning of the filter bags 12 based on the signal from the first mercury analyser 52, and could control the dosage of sorbent from the silo 30 based on a third parameter, which would be based on the signal from the second mercury analyser 54. In such an alternative embodiment a high concentration of mercury, i.e., HGIN>HGMEAN, is, first of all, handled by delaying the cleaning of the filter bags 12, in accordance with the method illustrated hereinbefore with reference to FIG. 2. If this is not sufficient, such that an increased emission of mercury, HGOUT, is measured by the second mercury analyser 54, then the dosage of sorbent from the silo 30 is increased, to increase further the capacity of the bag house 10 to remove mercury from the flue gas. Hence, the cleaning of the filter bags 12 is controlled based on the inlet concentration of mercury, HGIN, and the dosage of sorbent is based on the outlet concentration of mercury, HGOUT.

Figure 4:
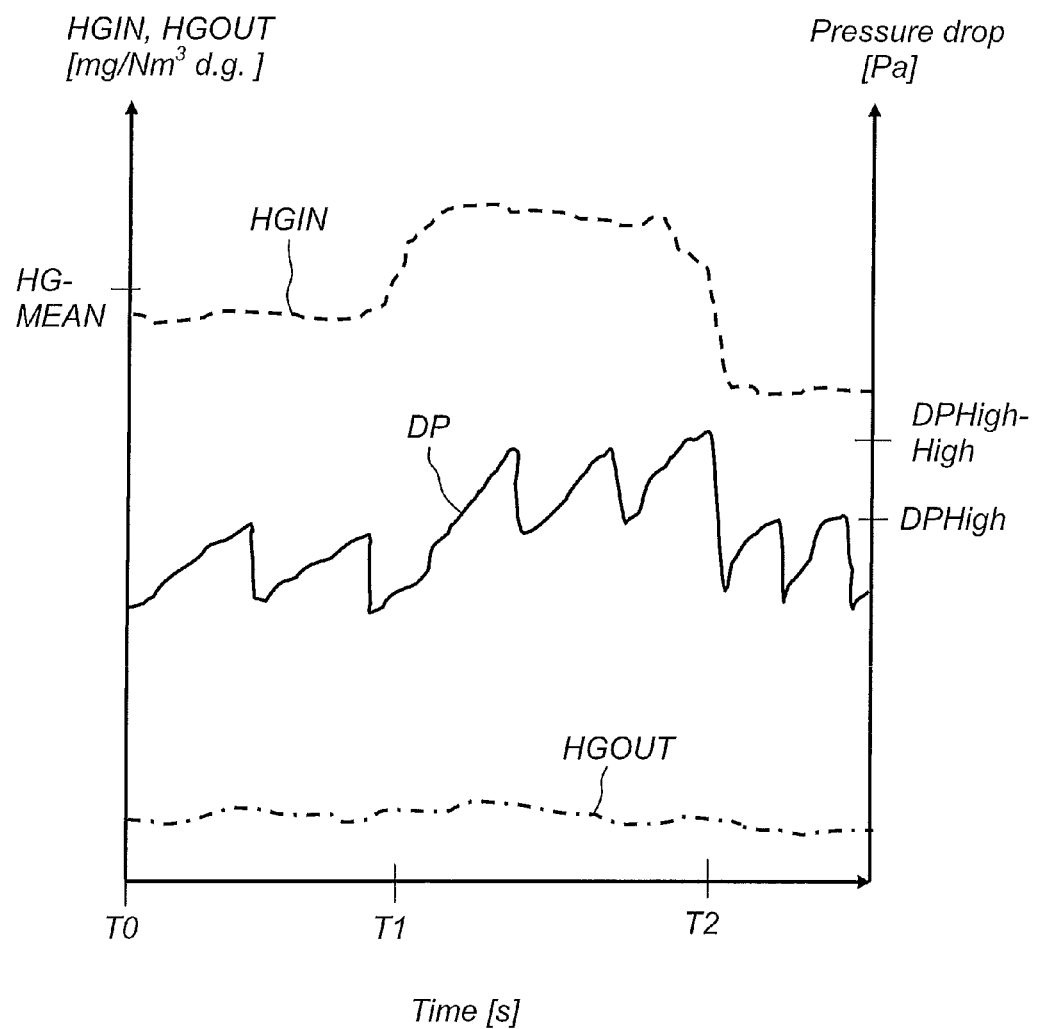
FIG. 4 is a schematic diagram, and illustrates the effect of operating a gas cleaning system in accordance with the method of FIG. 2

FIG. 4 illustrates a schematic example of the effect of the control unit 48 controlling the cleaning of the bag house 10 in accordance with the method described hereinbefore with reference to FIG. 2. For reasons of clarity the example of FIG. 4 refers to simultaneous cleaning of all compartments 14, 16, 18, which is not necessarily the best way of performing the cleaning, as described hereinbefore. The left y-axis refers to the concentration of mercury in $mg/Nm^3$ dry gas, and the right y-axis refers to the pressure drop over the bag house 10, in Pascal. The x-axis is a time scale. Between the times T0 and T1 illustrated in FIG. 4 the measured concentration of mercury in the duct 8, HGIN, is less than the mercury set point, which is the average concentration of mercury, HGMEAN, as measured during, e.g., the last 10 days. Thus, during T0 to T1, a full cleaning of the filter bags 12 is initiated, in accordance with the second alternative third step 68 described hereinbefore with reference to FIG. 2, each time the pressure drop DP over the bag house 10 exceeds DPHigh. However, at the time T1 the control unit 48 detects, in accordance with the first step 60 according to FIG. 2, that HGIN exceeds the mercury set point HGMEAN. In response to this observation the control unit 48 delays the cleaning of the filter bags 12, in accordance with the first alternative second step 62 illustrated in FIG. 2, until the pressure drop DP over the bag house 10 exceeds DPHighHigh. When the pressure drop DP exceeds DPHighHigh a partial cleaning of the filter bags 12 is performed in accordance with the first alternative third step 66 illustrated in FIG. 2. Such a partial cleaning results in that, as is illustrated in FIG. 4, the pressure drop DP over the bag house 10 is reduced from DPHighHigh to about DPHigh. Thus, starting at T1, the dust cake is allowed to grow thicker on the filter bags 12, until DP exceeds DPHighHigh, and the dust cake is not entirely removed by the partial cleaning.

As can be seen from a reference to FIG. 4 the concentration of mercury in the clean gas duct 26, i.e., HGOUT, does not increase after T1, in spite of the increased amount of mercury in the flue gas upstream of the bag house 10. Thus, the increased pressure drop over the bag house 10 after the time T1 provides a thicker dust cake which increases the capacity of removing mercury.

At the time T2 illustrated in FIG. 4 the control unit 48 detects that HGIN has decreased to below HGMEAN. Thus, after the time T2, the cleaning of the bags 12 is again controlled based on the pressure drop DP only, and thus the decision to clean or not to clean the filter bags 12 is taken in the second alternative second step 64 illustrated in FIG. 2.

It will be appreciated that numerous variants of the embodiments described above are possible within the scope of the appended claims.

Hereinbefore it has been described that the mercury set point is the average inlet mercury concentration HGMEAN. The HGMEAN value could either be a fixed value, based on experience, or could be a real long term rolling average, such as a monthly average of the mercury concentration as measured in the duct 8. It will be appreciated that other mercury set points could also be used. Examples of such mercury set points include a fixed specific value, not related to the average, such as 10 $mg/Nm^3$, or a value that is related to the average inlet mercury concentration, e.g., a mercury set point could be 120% of the HGMEAN value. Furthermore the mercury set point could be calculated continuously based on a mathematical equation. The basis for such mathematical equation could be parameters like temperature, flue gas flow, sorbent flow, etc. The control unit 48 could also be operative for optimizing the sorbent supply and the pressure drop DP at which the cleaning of the filter bags 12 is initiated in such a manner that overall operating costs are minimized, and mercury emission is kept below the emission limit as specified by authorities.

It has been described hereinbefore, with reference to FIGS. 2 and 3, that the cleaning of the filtering surfaces is delayed when an increased mercury removal efficiency is temporarily desired. With reference to FIG. 2 it has also been described that the cleaning efficiency during periods when an increased mercury removal efficiency is desired can be lower, see step 66 illustrating a partial cleaning, compared to periods when there is no desire for any increased mercury removal efficiency, see step 68 illustrating a full cleaning. In accordance with a further aspect of the invention, the cleaning efficiency of the cleaning of the filtering surfaces could be made lower during periods when an increased mercury removal is desired, without combining this with a delay of the cleaning. Hence, a desire for an increased removal capacity with respect to mercury could be handled by, as a first alternative being illustrated in FIG. 3, delaying the cleaning of the filtering surfaces, or, as a second alternative being indicated by steps 66 and 68 of FIG. 2, by cleaning the filtering surfaces at a lower cleaning intensity, or, as a third alternative being illustrated in FIG. 2, by combining the delaying of the cleaning of the filtering surfaces with the cleaning of the filtering surfaces at a lower cleaning intensity. Thus, the increased mercury removal at times of high mercury concentrations can be achieved by delaying the cleaning of the filtering surfaces and/or by cleaning the filtering surfaces at a lower cleaning intensity.

It has been described hereinbefore that the control unit 48 compares a first parameter in the form of the measured concentration of mercury, as measured either upstream or downstream of the bag house 10, to a mercury set point. The control unit 48 may also be operative for predicting the future mercury load, and to control the cleaning of the filter bags 12 based on such a prediction. For example, the control unit 48 could calculate the derivative of the inlet mercury concentration, HGIN of FIG. 4. Based on such derivative the control unit 48 would be able to predict that the inlet mercury concentration is about to increase rapidly and to act accordingly, by delaying cleaning of the filter bags 12, and possibly by also increasing the supply of sorbent from the silo 30. In such a case the mercury set point is a mercury concentration change rate, to which the derivative of the measured mercury concentration is compared when the control unit 48 is to determine whether the cleaning of the filter bags is to be delayed or not. Furthermore, a more advanced function could also be utilized for obtaining a value of a first parameter that is indicative of the amount of mercury that needs to be removed in the filter. Such a function could calculate a mercury value, for use as said first parameter, based on the absolute value of the measured mercury concentration and the first derivative of the measured mercury concentration, and the second derivative of the measured mercury concentration. Such a function could have the general appearance of:

$$\text{Mercury value} = F(\text{HGIN}(t), d1(\text{HGIN}(t)), d2(\text{HGIN}(t))) \quad [\text{eg. 1.1}]$$

The Mercury value calculated by means of the above function, eq. 1.1, could be compared to a corresponding mercury set point. In accordance with a further alternative a function could be obtained that also accounts for the measured concentration of mercury in the cleaned process gas, i.e., in the clean gas duct 26, and the derivative of such mercury concentration. Such a function could have the general appearance of:

$$\text{Mercury value} = F(\text{HGIN}(t), \text{HGOUT}(t), d(\text{HGIN}(t)), d(\text{HGOUT}(t))) \quad [\text{eg. 1.2}]$$

Such a function would thus account for both inlet and outlet concentrations of mercury, and the rate of changes in such concentrations. The Mercury value calculated by means of the above function, eq. 1.2, could be utilized as said first parameter and be compared to a corresponding mercury set point. Thus, there are several ways of obtaining a first parameter that is indicative of the amount of mercury that needs to be removed in the filter. In its simplest application the mercury concentration is measured upstream or downstream of the filter and is, in the form of a first parameter, compared to a fixed mercury set point. In more advanced applications the mercury concentration is measured both upstream and downstream of the filter and a first parameter in the form of a mercury value is calculated based on a complex function, such as that of eq. 1.2, and is compared to a mercury set point that in itself could be calculated based on another complex function. A very simple equation for calculating a first parameter in the form of a mercury value is given in eq. 1.3:

$$\text{Mercury value} = \text{HGIN} + \text{HGOUT} * \text{constant } K \quad [\text{eq. 1.3}]$$

The constant K of eq. 1.3 could typically be 5-15. A first parameter calculated in accordance with eq. 1.3 could be compared to a mercury set point being the average inlet mercury concentration times a factor 2. Hence, when the first parameter, calculated in accordance with eq. 1.3, is larger than HGMEAN*2, then the cleaning of the filter bags 12 should be delayed, and/or made at a lower cleaning intensity.

It has been described, with reference to FIG. 4, that the pressure drop DP over the bag house 10 is measured, and is utilized for controlling when the filter bags 12 should be cleaned. It will be appreciated that other parameters may also be measured for the purpose of establishing when cleaning of the bags 12 is required. One such example is the filter flow resistance in Pa s/m, which can be calculated from the ratio of the signal for the measured filter pressure drop and the signal for the measured gas flow. According to a further alternative simple timers could be utilized for controlling when the cleaning of the filter bags 12 should be initiated, provided that the operating conditions of the bag house 10 are quite stable as regards flow of process gas, and amount of material collected per unit of time. Thus, for example, when the amount of mercury is low, the bags could be cleaned every 30 minutes. When the amount of mercury increases above the mercury set point the cleaning of the bags could be made only every 45 minutes, to increase the mercury removal efficiency of the bag house 10 by forming thicker dust cakes.

Hereinbefore it has been described that the filter is a bag house 10. It will be appreciated that other types of fabric filters, that do not have filter bags, may also be utilized. For instance, such fabric filters could have fabric pockets or flat walls of fabric, through which the process gas has to pass. Still further, it would also be possible to utilize other types of filters, such as electrostatic precipitators, such as that described hereinbefore with reference to U.S. Pat. No. 4,502, 872, or cyclones. Usually, however, fabric filters are preferred, since a dust cake, through which the process gas has to pass, is easily built up on such a filter. As described hereinbefore, influencing the thickness of the dust cake, by delaying the cleaning of the filtering surface and/or by performing the cleaning at a lower cleaning intensity, when needed in view of the amount of mercury that needs to be removed in the filter, has a large effect on the mercury removal capacity of the filter.

To summarize, a method of removing mercury from a process gas by means of a sorbent and a filter 10 involves applying said sorbent to at least one filtering surface 12 of the filter 10. A first parameter HGIN; HGOUT, which is indicative of the amount of mercury that needs to be removed in said filter 10, and a second parameter DP, which is indicative of the amount of material that has been collected on said filtering surface 12, are measured. The measured value of said first parameter HGIN; HGOUT is compared to a mercury set point HGMEAN. When said measured value of said first parameter HGIN; HGOUT is higher than said mercury set point HGMEAN, the cleaning of said filtering surface 12 is delayed, compared to the point in time suggested by the measured value of said second parameter DP, and/or is performed at a lower cleaning intensity.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A gas cleaning system for removing, at least partly, mercury from a process gas, comprising:
   a control unit to control when a filtering surface of a filter of said gas cleaning system is to be cleaned of material collected thereon,
   said control unit further to receive a first signal of a measurement from upstream of the filter of at least one first parameter indicative of an amount of mercury to be removed in said filter and a second signal of a measurement of at least one second parameter indicative of an amount of material collected on said filtering surface, utilized for determining when the filtering surface should be cleaned,
   the control unit still further to compare a measured value of said first parameter to a mercury set point, to delay, when said measured value of said first parameter indicates an amount of mercury higher than an amount of mercury indicated by said mercury set point, the cleaning of said filtering surface as compared to a point in time suggested by a measured value of said second parameter, and to clean the filtering surface at a selected intensity when the measured value of the second parameter exceeds a first pressure drop set point when the measured value of the first parameter indicates an amount of mercury equal to or lower than the amount of mercury indicated by the mercury set point, and when the second parameter exceeds a second pressure drop set point with a higher pressure drop than the first pressure drop set point when the measured value of the first parameter indicates an amount of mercury higher than an amount of mercury indicated by the mercury set point, for increased mercury removal.

2. A gas cleaning system according to claim 1, wherein said mercury set point is a concentration of mercury in the process gas upstream of the filter measured by a first mercury analyser, such concentration related to said first parameter.

3. A gas cleaning system according to claim 1, wherein said mercury set point is related to a concentration of mercury in the process gas downstream of the filter measured by a second mercury analyser, such concentration related to said first parameter.

4. A gas cleaning system according to claim 1, wherein said second parameter is a pressure drop over the filter, and the control unit initiates cleaning of the filtering surface when said second parameter exceeds a first pressure drop set point, and initiates cleaning of the filtering surface when said second parameter exceeds a second pressure drop set point, which refers to a higher pressure drop than the first pressure drop set point.

* * * * *